THICKNESS-SHEAR-MODE MECHANICAL FILTER

Filed Sept. 18, 1957 2 Sheets-Sheet 1

INVENTOR.
ROSHAN LAL SHARMA
BY Moody and Goldman
ATTORNEYS

Dec. 20, 1960 R. L. SHARMA 2,965,861

THICKNESS-SHEAR-MODE MECHANICAL FILTER

Filed Sept. 18, 1957 2 Sheets-Sheet 2

INVENTOR.
ROSHAN LAL SHARMA
BY Moody and Goldman
ATTORNEYS 2,965,861

THICKNESS-SHEAR-MODE MECHANICAL FILTER

Roshan Lal Sharma, San Fernando, Calif., assignor to Collins Radio Company, Cedar Rapids, Iowa, a corporation of Iowa Filed Sept. 18, 1957, Ser. No. 684,711

6 Claims. (Cl. 333—71)

This invention relates generally to electromechanical devices which provide frequency selectivity. In particular, the invention relates to filters having a plurality of mechanically-resonant plates coupled together in a parallel manner for vibration in the thickness-shear-mode.

The invention provides a mechanical filter which reduces the narrow-tolerance dimensions of each vibrating plate to a single critical dimension. Prior filters, such as parallel-disc filters vibrate in circular symmetrical modes and have two critical dimensions for each disc, which are its thickness and diameter.

The present invention utilizes an arrangement of parallel, rectangular vibrating plates, wherein only the thickness of each plate is its critical frequency-controlling dimension. The other two dimensions of the plate (herein called lateral dimensions) may be proportioned in any manner as long as these dimensions are many times greater than the thickness of the plate. In general, the lateral configuration will be chosen with regard to the spurious frequency response of a plate.

As stated, the frequency of each plate is determined by the thickness dimension of the plate approximately according to the following formula:

$$f(n)=\frac{n}{2h}\sqrt{\frac{\mu}{\rho}}$$

in which $n$ represents the thickness-shear-mode of vibration and is an integer, $f(n)$ represents the vibration frequency of the $n$th mode, $h$ is the thickness of the disc, $\mu$ is the shear modulus of the plate material, and $\rho$ is the density of the plate material. This formula becomes more accurate as the thickness of the plate becomes smaller in comparison to its other dimensions.

The plates are bound together by metallic connectors, such as provided between them. The lateral positions of such inserts are not critical with respect to the desired thickness-shear-mode of vibration, and generally will be chosen to provide maximum mechanical rigidity, and in some cases the insert positions affect the transmission of spurious response.

The plates can be made from either metallic material or ceramic material capable of being excited in a pure shear mode. In general, it is preferable to use a metallic material having a substantially zero-temperature coefficient, such as Nispan C.

The filter may be excited mechanically by either magnetostrictive or electrostrictive means, or may be excited piezoelectrically. Input and output excitation is provided at filter terminal plates, the input being provided at one terminal plate and the output being removed at the opposite terminal plate. For magnetostrictive excitation of a plate, a pair of transducer rods are fastened respectively to its opposite sides. With proper terminating conditions, a single rod can be used with a terminal plate to provide the output. Each rod extends parallel to the face of the plate. A single rod used on a plate side should generally align with a bisector of the plate surface. Transducer coils and permanent flux bias of known type are provided respectively about the rods. The transducer rods are actuated by magnetostrictive or electrostrictive forces to move the opposite faces of the plate in opposite parallel directions to obtain odd-order thickness-shear modes of vibration. When the transducer rods actuate the opposite faces in the same direction, even-order thickness-shear modes are provided.

At high frequencies, it is preferable to excite the terminal plates piezoelectrically or electrostrictively. This is done by making the end plates from quartz or from certain types of ceramics, such as barium titanate, to provide thickness-shear transduction. The opposite faces of the dielectric terminal plates are coated with a conducting material such as silver plating. Whether the terminal plates are actuated piezoelectrically, electrostrictively, or magnetostrictively, the intermediate plates of the filter can be either metallic or nonmetallic, since their contribution to filter operation is entirely a mechanical vibration, characteristic of most rigid materials.

Futher objects, features and advantages of this invention will become apparent to a person skilled in the art upon further study of the specification and accompanying drawings, in which.

Figure 1:
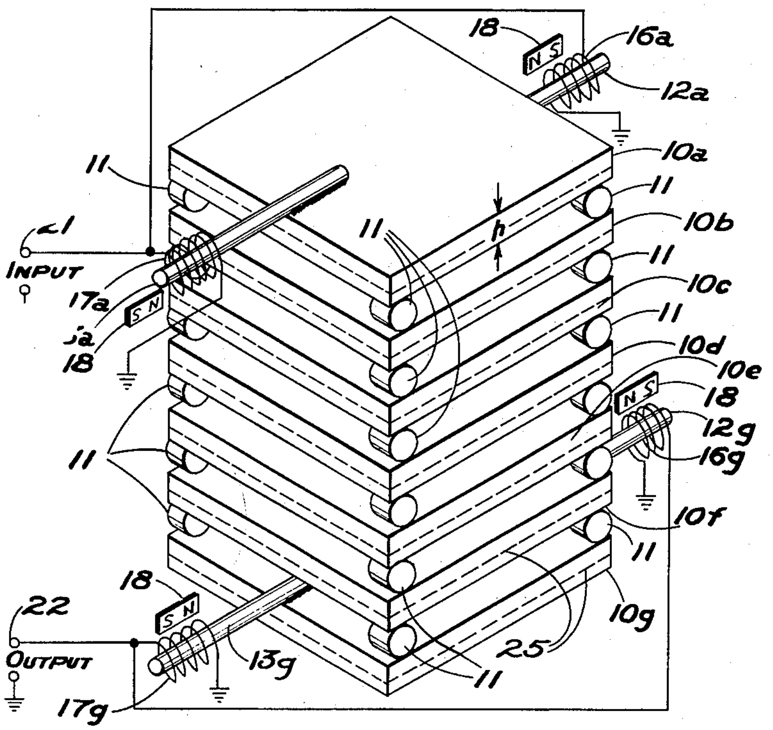
Figure 1 illustrates an embodiment of the invention having magnetostrictive transducers.

Now referring to the drawings, Figure 1 illustrates an embodiment of the invention having a plurality of similar rectangular plates 10($a$) through 10($g$), each having a thickness $h$ and being made of a zero temperature-coefficient metal, such as Nispan C. The plates are mechanically fastened by means of a plurality of inserts 11 soldered or welded between the adjacent corners of the plates. Accordingly, the plates are parallel spaced by the uniform diameters of the respective inserts, which are easily made from wire having constant diameter. The filter bandwidth can be varied by varying the dimensions of the inserts, such as their diameter and/or length.

The terminal plates of the filter are 10($a$) and 10($g$); and each has a pair of transducer rods 12 and 13 fastened to its opposite surfaces and extending in opposite but parallel directions to the surfaces. Each rod is aligned with a geometric perpendicular bisector of its connected surface. Excitation coils 16 and 17 are respectively provided about transducer rods 12 and 13, and permanent magnets 18 are provided adjacent the respective rods to provide the magnetic bias necessary for proper magnetostrictive operation, as is well-known. Coils 16($a$) and 17($a$) are connected in parallel to a single-ended input terminal 21. Similiarly, coils 16($g$) and 17($g$) are connected in parallel to a single-ended output terminal 22. With this arrangement, the coil currents excite their coils in the same manner, but due to the opposite positions of respective rods 12 and 13, they are moved in opposite directions to accordingly move the opposite faces of their respective plates in opposite directions, thus exciting them in an odd-order thickness-shear-mode, such as, for example, the first mode.

Figure 2:
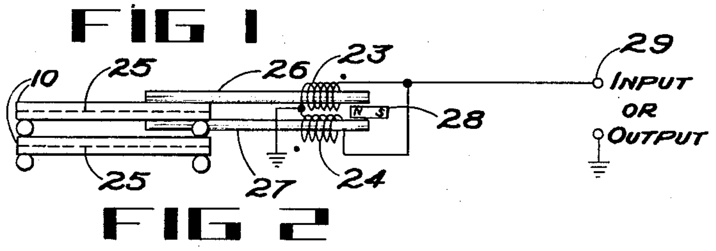
Figure 2 shows a different magnetostrictive transducer arrangement.

In some cases, transducer rods 12 and 13 can be extended in the same direction as shown in Figure 2. Here, coils 23 and 24 are provided respectively about magnetostrictive transducer rods 26 and 27, and a single permanent magnet 28 is provided to bias both. However, with this arrangement it is essential to excite the coils oppositely to provide odd-order mode excitation. This requires that the coils be wound in opposite directions when connected in parallel. First-order excitation is shown in Figure 2 by single nodal-plane 25.

Figure 3:
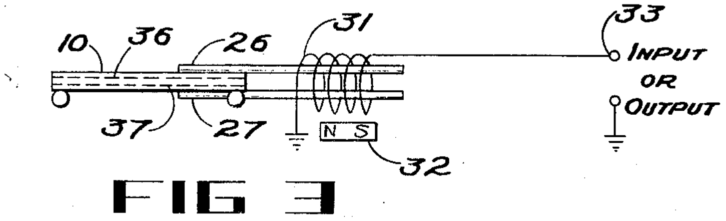
Figure 3 illustrates a magnetostrictive even-order rod transducer.

For even-order excitation, coils 23 and 24 would be wound in the same direction. However, even-order thickness-shear-mode excitation, such as the second mode, is provided with the transducer arrangement in Figure 3. Transducer rods 26 and 27 are extended in the same direction, and a single coil 31 is provided about both rods and a permanent magnet 32 biases them. Coil 31 is connected to terminal 33 which is coupled to a single ended signal source. Null planes 36 and 37 illustrate the second thickness-shear mode.

The thickness-shear mode of vibration is transverse to the direction of propagation of the wave through the filter. The vibration is coupled by inserts 11 to the various plates of the filter. Only vibrations within the bandpass (at or near the tuned frequency $f(n)$ determined by the thickness of the plates) are transmitted through the filter, giving it the necessary selectivity. The last plate receives the vibration and transduces it back into electrical energy to provide the output of the filter. The physics of thickness-shear vibration creates null planes, and the number of null planes determines the mode of vibration.

Figure 4:
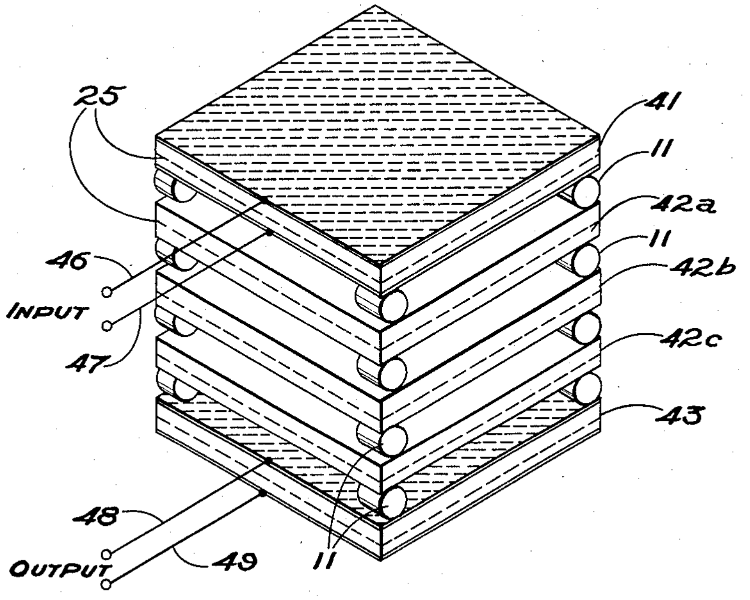
Figure 4 is a form of the invention having piezoelectric transducers.

Figure 4 illustrates the invention using piezoelectric or electrostrictive transducers. In general, piezoelectric or electrostrictive transducers are preferabl to magnetostrictive transducers at high frequencies, such as frequencies above about 500 kilocycles-per-second.

The plates in Figure 4 are bound together by inserts 11 in the same manner as taught with Figure 1. However, terminal plates 41 and 43 are made of quartz or ceramic material such as barium titanate and are coated on opposite faces with silver metal, which is highly conductive. Adjacent spacer inserts 11 are soldered to the silver-surfacing material. The quartz or the ceramic from which the terminal plates are made has its crystals oriented or prepolarized so that a potential applied to its plates causes a thickness-shear mechanical excitation. Such crystal orientation is well-known in the art. Leads 46 and 47 are connected to opposite sides of input plate 41; and similarly output leads 48 and 49 are connected to opposite sides of output plate 43.

Where the thickness of a plate is very small compared to its lateral dimensions, its first-order shear-mode resonant frequency is primarily determined by thickness dimention and is only secondarily influenced by the lateral dimensions, which therefore become noncritical. In general, each lateral dimension of a plate should exceed its thickness by five times or more. However, spurious frequency responses of a given plate are also a primary function of the lateral dimensions as well as the thickness. Consequently, the spurious response of a filter can be improved by making the lateral dimensions slightly different for the individual plates, while having about the same thickness for each plate to provide a uniform thickness-shear mode frequency.

Where the plates are made by a stamping operation, lateral tolerance variations caused by stamping desirably vary the spurious response from plate to plate. Final frequency control can be obtained by lapping the thickness dimension only, if a final frequency adjustment is necessary. Even after final assembly of the filter, its spurious response can be altered by filing or grinding a slight amount of material from an edge of one or more plates.

Although this invention has been described with respect to particular embodiments thereof, it is not to be so limited as changes and modifications may be made therein which are within the full intended scope of the invention as defined by the appended claims.

I claim:

1. A thickness-shear-mode mechanical filter, comprising a plurality of plates, each plate having a thickness dimension $h$ determined by the expression $$f(n)=\frac{n}{2h}\sqrt{\frac{\mu}{\rho}}$$

in which the resonant frequency of the plate is $f(n)$ for the $n$ mode, $\mu$ is the shear modulus of the plate material and $\rho$ is the density of the material, each plate having lateral dimensions at least five times its thickness; metallic members connecting said plates in a parallel manner, said plates being stacked in the direction of their shortest dimensions, an input plate and an output plate disposed at oppcsite ends of said filter, a first magnetostrictive transducer being connected to said input plate for exciting said plate in the thickness-shear-vibration mode having a nodal plane perpendicular to the smallest dimension $h$, and a second magnetostrictive transducer being connected to said output plate for changing thickness-shear mechanical vibrations of said output plate to an electrical signal, said metallic members coupling said thickness-shear-vibration mode from one plate to another, each of said transducers including at least one magnetostrictive rod fixed to and extending away from its respective plate without alignment with said nodal plane, first coil means provided with said first transducer, and second coil means provided with said second transducer, and magnetic bias means provided with each of said transducers.

2. A thickness-shear-mode mechanical filter as defined in claim 1 in which, said rods extend in opposite directions away from their respective plates, said coil means comprising a separate coil about each rod, each coil associated with said first transducer being connected to a signal source, and each coil associated with said second transducer providing the output of said filter.

3. A thickness-shear-mode mechanical filter as defined in claim 1 in which said first and second magnetostrictive transducers each include a plurality of magnetostrictive rods fixed to and extending in the same direction away from their respective plate, an input coil wound about the rods of said first transducer, an output coil wound about the rods of said second transducer, said filter vibrating in an even-order thickness-shear mode.

4. A thickness-shear-mode mechanical filter as defined in claim 1 in which each magnetostrictive transducer includes a pair of rods extending in the same direction from their respective plate, a first coil provided about one of said rods, a second coil provided about the other of said rods, said coils utilizing opposite-phased signals for plate vibrations in an odd-order the thickness-shear mode.

5. A thickness-shear-mode mechanical filter as defined in claim 1 in which said plates are all rectangular in shape, and said mechanical means comprising a plurality of small metal cylinders having their round sides fastened respectively between the corners of adjacent plates.

6. A thickness-shear-mode mechanical bandpass filter comprising a plurality of plates, each plate having a thickness dimension $h$ determined by the expression:

$$f(n)=\frac{n}{2h}\sqrt{\frac{\mu}{\rho}}$$

in which the resonant frequency of the plate is $f(n)$ for the $n$ mode, $\mu$ is the shear modulus of the plate material and $\rho$ is the density of the material, each plate having lateral dimensions at least five times its thickness; metallic members connecting said plates in a parallel manner, said plates being stacked in the direction of their shortest dimensions, an input plate and an output plate disposed at opposite ends of said filter, said input and output plates being made of piezoelectric material, and each having conducting material applied to opposite sides, input leads respectively connected to the conducting material on the opposite sides of said input plate, and output leads respectively connected to conducting material on the opposite sides of said output plate.

References Cited in the file of this patent

UNITED STATES PATENTS

| | | |
|---|---|---|
| 2,309,467 | Mason | Jan. 26, 1943 |
| 2,373,431 | Sykes | Apr. 10, 1945 |
| 2,501,488 | Adler | Mar. 21, 1950 |
| 2,554,332 | Jaffe | May 22, 1951 |
| 2,661,433 | Jaffe | Dec. 1, 1953 |
| 2,711,515 | Mason | June 21, 1955 |
| 2,802,992 | Doelz | Aug. 13, 1957 |
| 2,810,888 | George et al. | Oct. 22, 1957 |